United States Patent
Kirn (10) Patent No.: US 9,592,904 B2
(45) Date of Patent: Mar. 14, 2017

(54) DRIVE MECHANISM FOR A DEFORMABLE STRUCTURE, STRUCTURAL COMPONENT PROVIDED THEREWITH AND FLOW BODY AND LIFT-ASSISTING DEVICE

(71) Applicant: Airbus Defence and Space Gmbh, Ottobrunn (DE)

(72) Inventor: Johannes Kirn, München (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 176 days.

(21) Appl. No.: 14/567,361

(22) Filed: Dec. 11, 2014

(65) Prior Publication Data

US 2015/0166172 A1    Jun. 18, 2015

(30) Foreign Application Priority Data

Dec. 12, 2013    (EP) .................................... 13196994

(51) Int. Cl.

| | |
|---|---|
| B64C 3/38 | (2006.01) |
| B64C 5/10 | (2006.01) |
| B64C 9/00 | (2006.01) |
| B64C 13/00 | (2006.01) |
| B64C 13/28 | (2006.01) |
| B64C 3/48 | (2006.01) |
| F16H 21/44 | (2006.01) |

(52) U.S. Cl.
CPC ................ *B64C 13/28* (2013.01); *B64C 3/48* (2013.01); *F16H 21/44* (2013.01); *Y10T 74/18928* (2015.01)

(58) Field of Classification Search
CPC .... B64C 3/48; B64C 3/52; B64C 9/04; B64C 13/26; B64C 13/28; F16H 21/44
See application file for complete search history.

(56) References Cited

U.S. PATENT DOCUMENTS

| | | | | |
|---|---|---|---|---|
| 2,524,605 A | * | 10/1950 | Servanty | B64C 13/00 244/216 |
| 3,836,099 A | * | 9/1974 | O'Neill | B64C 3/48 244/214 |
| 4,470,569 A | * | 9/1984 | Shaffer | B64C 9/22 244/213 |

(Continued)

FOREIGN PATENT DOCUMENTS

| | | |
|---|---|---|
| DE | 2026054 A1 | 12/1970 |
| EP | 1637450 A2 | 3/2006 |
| WO | 02/47976 A2 | 6/2002 |

OTHER PUBLICATIONS

The European Search Report for the corresponding European application No. 13196994.1, issued on May 27, 2014.

*Primary Examiner* — Philip J Bonzell (74) *Attorney, Agent, or Firm* — Global IP Counselors, LLP (57) ABSTRACT

A drive mechanism for deforming a skin of a deformable structural component of a fluid-dynamic flow body to provide a space-saving drive concept for large deformations under great loads. The drive mechanism comprises a linearly movably driven linear movement unit, and a transmission element configured to translate linear movement of the linear movement unit into rotary movement of a rotatably mounted load introduction device of the structural component to introduce a deformation force onto the skin.

20 Claims, 5 Drawing Sheets

(56) References Cited

U.S. PATENT DOCUMENTS

| | | | | |
|---|---|---|---|---|
| 5,651,513 A | * | 7/1997 | Arena | B64C 9/04 |
| | | | | 244/215 |
| 5,836,550 A | * | 11/1998 | Paez | B64C 9/22 |
| | | | | 244/214 |
| 6,464,176 B2 | * | 10/2002 | Uchida | B64C 3/50 |
| | | | | 244/216 |
| 8,596,582 B2 | * | 12/2013 | Uchida | B64C 9/02 |
| | | | | 244/213 |
| 2012/0091283 A1 | | 4/2012 | Uchida et al. | |

* cited by examiner

DRIVE MECHANISM FOR A DEFORMABLE STRUCTURE, STRUCTURAL COMPONENT PROVIDED THEREWITH AND FLOW BODY AND LIFT-ASSISTING DEVICE

CROSS-REFERENCE TO RELATED APPLICATION

This application claims priority under 35 U.S.C. §119(a) to European Patent Application No. 13 196 994.1, filed on Dec. 12, 2013, the entire contents of European Patent Application No. 13 196 994.1 are hereby incorporated herein by reference.

BACKGROUND

Field of the Invention

The invention relates to a drive mechanism for driving a deformation of a skin of a deformable structural component of a fluid-dynamic, in particular aerodynamic, flow body, which structural component has a skin to be deformed and a rotatably mounted load introduction device for introducing the deformation force onto the skin. Further, the invention relates to a deformable structural component for a fluid-dynamic, in particular aerodynamic, body of a vehicle, in particular an aircraft, comprising a skin to be deformed and such a drive mechanism. Further, the invention relates to a vehicle's fluid-dynamic, in particular aerodynamic, flow body, such as a wing or the like of an aircraft, provided with such a deformable structural component. Finally, the invention relates to a lift-assisting device for an airplane.

Background Information

A deformable structural component with a drive mechanism for driving the deformation has been developed and investigated, for example, in the research project "Smart-LED" (LuFo4) and in the research project "SADE(EU)". Further details regarding the project "SADE" and a documentation of publications pertaining thereto are available on the website www.sade-projekt.eu/index.html.

Adaptive structures of the type investigated in the SADE project are particularly suitable for deforming aerodynamic surfaces of aircraft, such as wings, fins or rotor blades, for example. In particular in the case of airplane wings, it is advantageous to use so-called droop leading edge flaps (or droop noses) as lift-assisting devices, instead of conventional slats. In the case of the droop nose, which is hereinafter referred to by this term, the entire wing nose is angled in a downward direction. The wing camber thus increases. One implementation of a droop nose is realized, as a so-called droop nose device, on the inner wing of the Airbus A380, for example.

SUMMARY

Conventional slats are unsuitable for laminar flows and, further, are a dominant source of noise. In the case of the Airbus A380, however, a droop nose device is realized through a rigid body movement, which already provides major advantages over conventional slats.

The investigations of the SADE project have the aim of obtaining adaptive structures for aerodynamic bodies with which greater geometric liberties, a reduction of local bending and loads and more laminar flows can be obtained as compared with known droop nose devices.

In the case of earlier droop nose solutions, the entire front nose of the wing as a whole is moved as a rigid body. However, the SADE project is based on the approach of deforming the primary structure. Thus, it is possible to work without any gaps with a closed aerodynamic surface, avoid large local radii of curvature and therefore also achieve an improved cp distribution and a lower separation tendency.

Therefore, a disclosed embodiment is directed to a drive concept for a deformable structural component with a skin to be deformed over a large area, which structural component can be deformed by a drive mechanism in order to create an adaptive structure.

In the case of previous deformable, adaptive, thin-walled structures, such as for a droop nose, for example, the introduction of forces preferably takes place by means of an auxiliary structure (e.g. an omega stringer) in order to reduce local excessive tensions and to not interfere with the deformability of the primary structure. Fittings are attached to this auxiliary structure in order to enable through them a movably mounted force introduction (e.g. via struts and joint head). In previous solutions, the struts are each situated on a main lever, with each main lever being provided with an actuating motor for rotating the main lever.

If, however, the creation of a wing or other fluid-dynamic body for a vehicle, such as particularly an aerodynamic body for an aircraft, is desired, which can be surrounded by a laminar flow, then as slim a structure as possible—e.g. a slim laminar-flow wing—would be advantageous. In particularly slim laminar-flow wings, the previous solutions cannot be employed with the given geometry, due to lack of space; the functional capability of the required kinematic mechanism would not be provided in this case.

Certain disclosed embodiments provide a drive concept for a kinematic mechanism of an adaptive structure with a small space requirement for a large deformation at large loads with a reduced complexity of the drive.

One embodiment provides a drive mechanism for driving a deformation of a skin of a deformable structural component of a fluid-dynamic, in particular aerodynamic, flow body, which structural component has a skin to be deformed and a rotatably mounted load introduction device for introducing the deformation force onto the skin, wherein the drive mechanism comprises a linearly movably driven linear movement unit and a transmission element for translating a linear movement of the linear movement unit into a rotary movement of the load introduction device.

According to a disclosed embodiment, the transmission element has a translation lever for translating the linear movement into a rotary movement. The translation lever acts on the linear movement unit and on the load introducing device. The translation lever is configured as a toggle joint or as a part of a toggle joint mechanism. Also, the translation lever is mounted in an articulated manner in such a way that it is able to move both in a single plane as well as move out of the plane.

According to a disclosed embodiment, the translation lever is mounted on the linear movement unit in a multi-axially articulated manner. The translation lever can be mounted on the load introduction device in a multi-axially articulated manner. The translation lever can be mounted on the linear movement unit in a mono-axially articulated manner and the linear movement element is mounted rotatably about a torsion axis substantially extending in the direction of movement of the linear movement element.

According to a disclosed embodiment, the linear movement unit is configured and arranged in such a way that the direction of movement of the linear movement unit extends parallel to an axis of rotation of the rotary movement of the load introducing device with at least one movement direction component, preferably with its largest movement direction component, or in its entirety. The linear movement unit has a drive rod displaceably mounted in its longitudinal direction. The linear movement unit has several rod elements successively arranged in the direction of movement and coupled to each other in an articulated manner.

Another disclosed embodiment provides a deformable structural component, provided with such a drive mechanism, for a fluid-dynamic body of a vehicle—in particular for an aerodynamic body of an aircraft—comprising a skin to be deformed and the drive mechanism for driving the deforming movement. The skin is fixed at its end portions so as to be stationary and the drive mechanism is configured to deform a middle portion of the skin that extends in a curved manner between the end portions.

A further embodiment provides a fluid-dynamic, in particular aerodynamic, flow body, which is provided with such a deformable structural component driven by the drive mechanism, and in which a trailing edge region is formed by the deformable structural component.

Still another embodiment provides a lift-assisting device for an airplane, which is formed with such a structural component that can be deformed driven by the drive mechanism, and which is configured as a droop nose device.

Thus, disclosed embodiments configure a leading edge of a laminar-flow profile (such as a leading wing edge of a laminar-flow wing) in an adaptively deformable manner. This requires a drive concept or kinematic mechanism. However, especially in the case of laminar-flow profiles, there is a lack of construction space which allows only for a limited number of actuators. In addition, the loads to be coped with are very large. A classic rotary driven kinematic mechanism is not feasible in very slim laminar-flow profiles to be deformed. In particular, in the case of the preferred applicability as a droop nose lift-assisting device, a large load arises at the leading edges of wings of aircraft, with only little available construction space.

Another aim of the disclosed embodiments is to provide a solution for reducing the complexity. Previous rotary kinematic mechanisms investigated in the SADE projection cannot be used in the case of very slim laminar-flow profiles with little construction space, even if, in their intended use, they offer a similar solution—the deformation of a leading wing edge. The solution contemplated so far is significantly more complex and geometrically less flexible than the drive concept presented herein.

According to a disclose embodiment, a linear link to the kinematic mechanism is proposed as a drive concept, in which the linear movement is translated into a rotary movement by a specific positioning of levers. To this end, a lever is mounted in an articulated manner in such a way that it is able to move both in the plane as well as out of it.

Generally, construction space can be gained and the complexity can be greatly reduced by the concept according to the disclosed embodiments. Other advantages are a possible reduction of weight, high stability and a greater fail-safeness. In addition, any number of kinematic mechanism stations can basically be driven at the same time due to the drive concept. Thus, the complexity of the system is greatly reduced. Another advantage is that, in the case of minimum or maximum kinematic mechanism amplitude, the actuator(s) can be free from load, whereby the safety of the system is increased.

As in the case of previous deformable, adaptive, thin-walled structures, such as for a droop nose, for example, the introduction of forces, also in preferred applications of the invention, preferably takes place by means of an auxiliary structure (e.g. an omega stringer) in order to reduce local excessive tensions and to not interfere with the deformability of the primary structure. Preferably, fittings are attached to this auxiliary structure in order to enable through them a movably mounted force introduction (e.g. via struts and joint head). Preferably, the struts are respectively situated on one of several main levers. With the drive concept according to the invention, however, the main levers can be driven much in a much simpler and safer manner than was the case so far. A linear movement of a linear movement unit can easily be transmitted along a wing edge or other elongate structure to be deformed, and be tapped at several locations, in order also to drive several main levers in this manner. The linear movement can be translated into a rotary movement of the respective main lever elegantly and simply, and nevertheless safely and also with high loads, and also so as to require little maintenance, by means of a translation lever, with the weight requirements also being small.

DESCRIPTION OF THE DRAWINGS

Exemplary embodiments of the invention will be explained in more detail below with reference to the attached drawings. In the drawings.

DETAILED DESCRIPTION OF EMBODIMENTS

With reference to the illustrations of FIGS. 1 and 2, an exemplary embodiment of an adaptive thin-walled structure 10 with a deformable structural component 12 will be explained in more detail below, taking a fluid-dynamic flow body—in this case in the form of, for example, an aerodynamic flow body 14 with a deformable aerodynamic surface—as an example. However, the invention can generally be applied to all thin-walled adaptive structures with deformable structural components that have a skin 16 to be deformed and an (e.g. indirect) load introduction, e.g. via stiffening profiles 18, for deforming the skin 16. In particular, a drive mechanism 11 for the adaptive structure 10 will be explained in detail below.

Then, an exemplary embodiment of the drive mechanism 11 will be explained in more detail with reference to the illustration of FIGS. 3 to 7.

Figure 1:
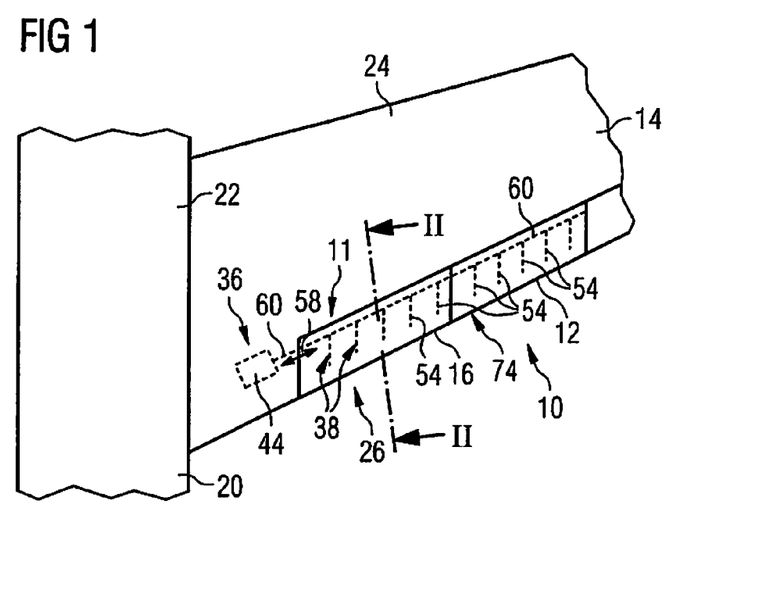
FIG. 1 shows a schematic top view onto an aircraft in the form of an airplane with a droop nose lift-assisting device for illustrating an example for adaptive structures with a deformable structural component and a drive mechanism for driving a deformation.

FIG. 1 shows, as an example for the fluid-dynamic, and in particular aerodynamic, flow body 14, an aircraft 20, in this case e.g. in the form of an airplane 22, with the wings 24 being provided with droop nose lift-assisting devices 26, which are realized by the adaptive structure 10.

Figure 2:
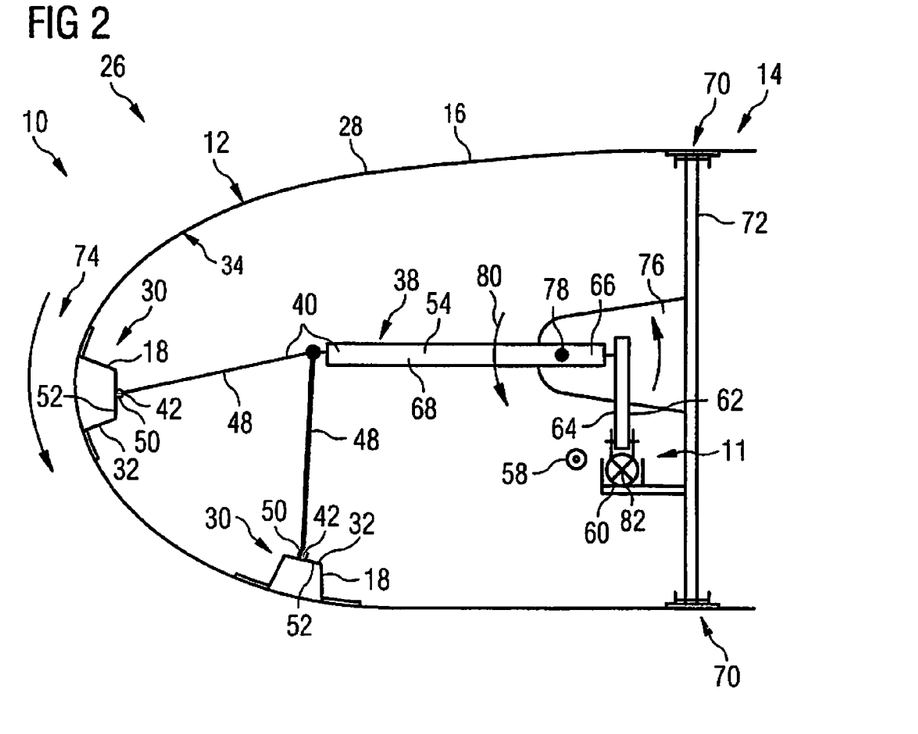
FIG. 2 shows a section along the line II-II of FIG. 1 through the adaptive structure and the deformable structural component.
Figure 3:
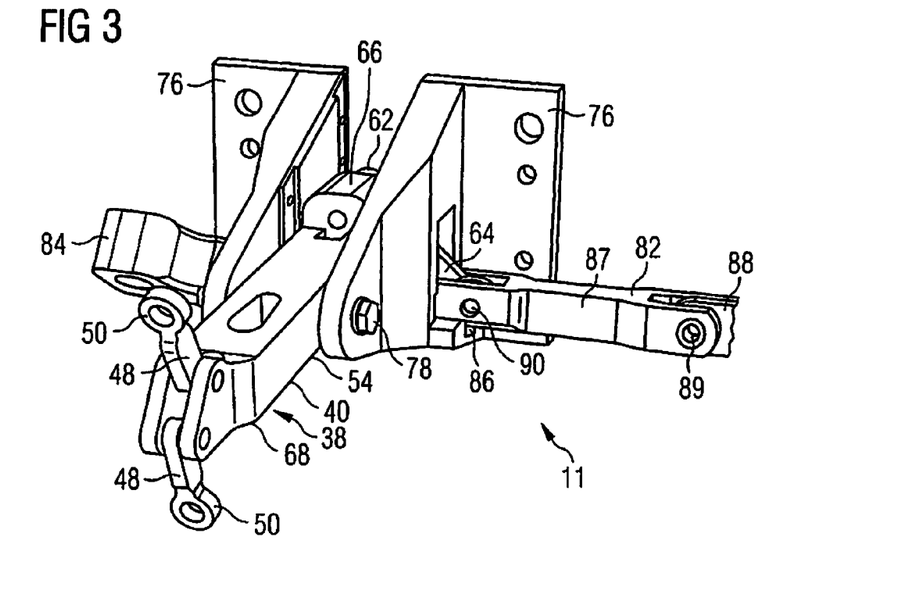
FIG. 3 shows a perspective view of an embodiment of the drive mechanism in a neutral position.
Figure 4:
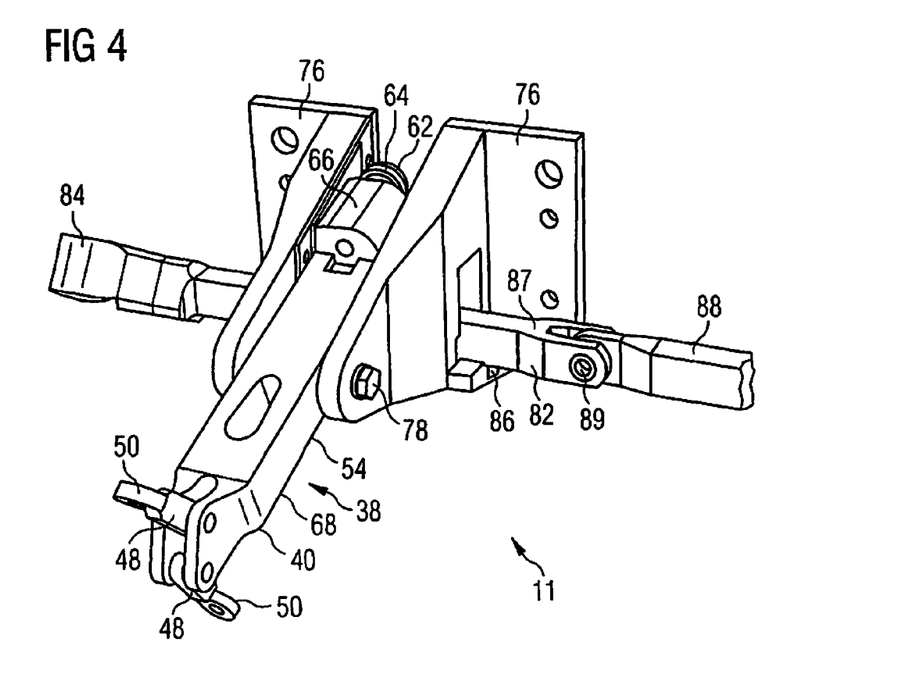
FIG. 4 shows a view as in FIG. 3 of the drive mechanism in a position for maximum deformation.
Figure 5:
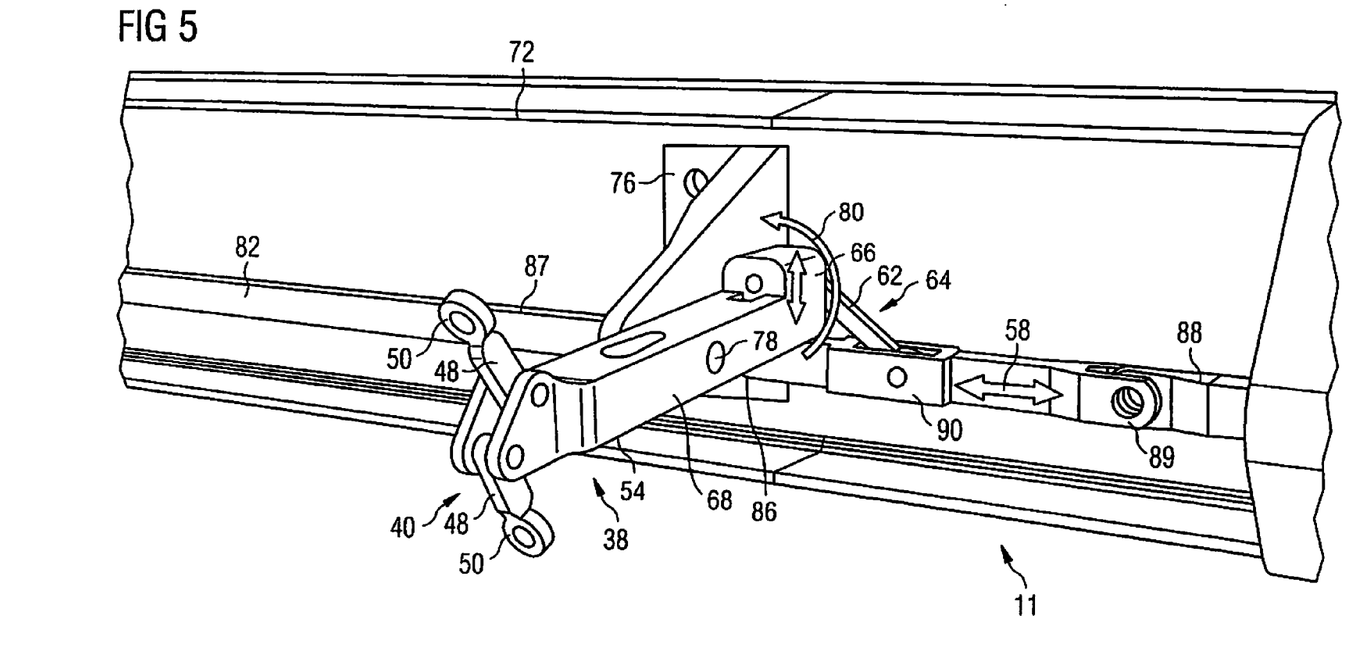
FIG. 5 shows another view of the drive mechanism, with an attachment fitting for a load introducing device having been omitted for better illustration.
Figure 6:
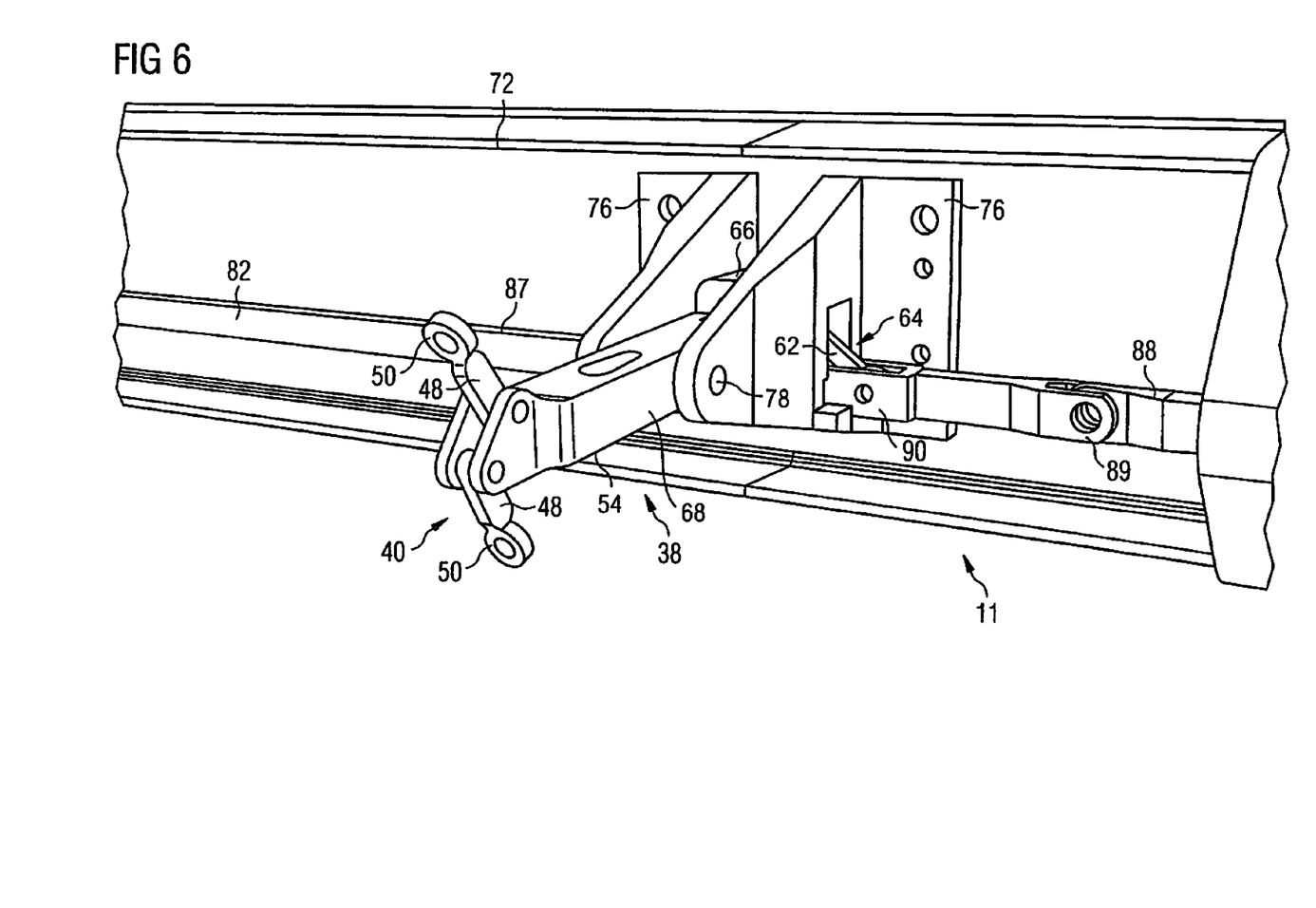
FIG. 6 shows an illustration comparable with FIG. 5 with both attachment fittings.
Figure 7:
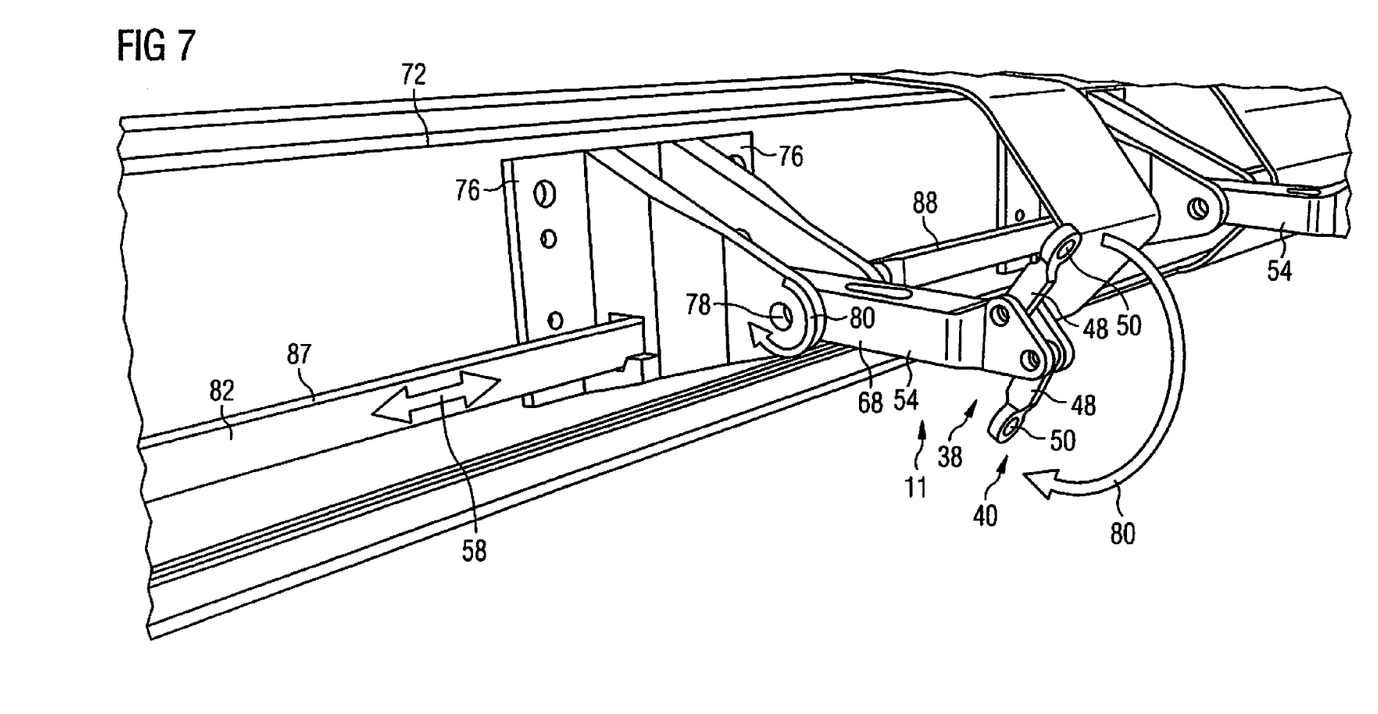
FIG. 7 shows another drive mechanism.

A cross-sectional illustration along the line II-II of FIG. 1 is depicted in FIG. 2. According thereto, the adaptive structure 10 comprises the deformable structural component 12. The deformable structural component 12 is configured as a part of the aerodynamic flow body 14 and comprises the skin 16, which is to be deformed as a whole over a large surface area in order to adapt the aerodynamic flow body 14 to a desired aerodynamic effect.

Accordingly, the adaptive structure 10 has a deformable primary structure 28, which is to be deformed so as to be as undisturbed as possible, wherein no gaps and no excessive radii of curvature are to be produced on the top side. For this purpose, the deformation force is introduced only indirectly into the primary structure 28 via an auxiliary structure 30.

The auxiliary structure 30 has several stiffening profiles 18. For example, the stiffening profiles 18 are formed by omega stringers 32. Other stiffening profile shapes are also possible; however, hollow profiles with an attachment to the skin 16 distributed over a larger surface area are preferred. Accordingly, the stiffening profiles 18 are attached to an inner surface 34 of the skin 16 to be deformed.

The drive mechanism 11 comprises at least one actuator 36 for generating a desired deformation force. In order to introduce the deformation load, the drive mechanism 11 is connected to the stiffening profiles 18 via a load introduction device 38. The load introduction device 38 comprises load introduction elements 40 that introduce the load at points of application 42—also referred to as points of action—into the stiffening profiles 18 or, more generally, into the auxiliary structure 30.

As shown in the FIG. 1, the actuator 36 is configured to produce a linear movement. For example, the actuator 36 comprises an actuating motor 44, which drives a linear movement on the drive mechanism 11 via a motor-driven spindle (not shown). In other embodiments, a hydraulic or pneumatic or magnetic or otherwise configured piston mechanism is provided as an actuator 36. Linear motors or an actuating motor with a toothed rack, etc., are also conceivable.

The drive mechanism 11 drives a rotary movement on the load introduction device 38, by means of which a force is introduced via struts 48 with a joint head 50 into load introduction elements 40 configured as fittings 52 at the point of application 42. The drive mechanism 11 is configured for driving the deformation of the skin 16 of the deformable structural component 12 of the aerodynamic flow body 14. The structural component 12 comprises the skin 16 to be deformed and the rotatably mounted load introduction device 38 for introducing the deformation force onto the skin 16.

As is apparent from FIG. 2, the drive mechanism 11 moreover has a linear movement unit 60 that is driven in a linearly movable manner by the actuator 36 and a transmission element 62 for translating a linear movement of the linear movement unit 60 into a rotary movement of the load introduction device 38. The transmission element 62 is formed, in particular, by a translation lever 64 that, on the one hand, is hinged to the linear movement unit 60 and, on the other hand, to the load introducing device 38.

For this purpose, the load introducing device 38 has a main lever 54, which has a two-arm configuration, wherein the translation lever 64, which acts as a transmission element 62 for translating the linear movement into a rotary movement, is hinged to a first arm 66, and the struts 48 with the joint heads 50 act on a second arm 68. The first arm 66 and the translation lever 64 form a toggle joint mechanism, with which even large loads can be transmitted.

The stiffening profiles 18 are each formed by an omega stringer 32 extending in the longitudinal direction of the structural component 12 to be deformed. In the exemplary use of the adaptive structure 10 shown in FIG. 1, the longitudinal direction corresponds to the direction of the wing span. At several spaced-apart locations, there are fittings 52 of which only one, respectively, is shown.

The direction of linear movement 68 of the linear movement unit 60 extends parallel to this longitudinal direction and with at least one directional component also parallel to the axis of rotation of the rotary movement of the load introducing device, i.e. in particular of the individual main levers 54. In the illustrated embodiment of a wing edge to be deformed, the direction of linear movement is directed substantially parallel to the direction of the wing edge, i.e. substantially in the direction of the wing span. The main lever 54 is directed substantially in the direction of flight, with its axis of rotation extending substantially parallel to the direction of linear movement 58.

As shown in FIG. 2, the load introduction device 38 has as the load introduction element 40 the main lever 54 and struts 48 with a joint head 50, which are hinged to the free end thereof, for connection with the fitting 52 in the omega stringers 32. The skin 16 is fixed in a stationary manner at the end portions or transition portions 70, where the deformable structure 10 transitions into a rigid structure of the aerodynamic flow body 14. For example, the skin 16 is attached to a wall 72 of the wing structure at these transition portions 70. The skin is curved in an arcuate manner from the lower transition portion to the upper transition portion in order to form the leading wing edge 74. The entire curved portion of the skin 16 can be deformed as a whole. The load introduction device 38 moreover has an attachment fitting 76, which is also attached in a stationary manner, e.g. to the wall 72 of the wing structure. The axis of rotation 78 of the rotary movement 80 of the load introduction device 38 is defined at this attachment fitting 76.

In the following, an exemplary embodiment of the drive mechanism will be explained in more detail with reference to the illustrations of FIGS. 3 to 7.

The linear movement unit 60 of the drive mechanism 11 has a drive rod 82 which has at one end thereof an actuator connector 84 for coupling it to an output member of the actuator 86. The drive rod 82 is mounted in guide rails 86, which may be disposed on the attachment fitting 76, so as to be linearly displaceable in the direction of linear movement 58.

The drive rod 82 is preferably divided into several rod elements 87, 88 which are coupled to each other in an articulated manner by means of a coupling joint 89, in order to compensate for the bending of the aerodynamic flow body 14, in particular for the bending of the wing 24. As can best be seen from FIG. 7, the drive rod 82 can thus be guided to several main levers 54 and thus drive several main levers 54 together.

In the area of the attachment fittings 76 of each main lever, the drive rod 82 has a joint connector 90 for the articulated, i.e. e.g. rotatable, hinge mounting of a first end of the translation lever 64. In one embodiment, the joint between the translation lever 64 and the drive rod 82 formed by the joint connector 90 is a multi-axis joint, in order, on the one hand, to enable a rotation of the translation lever 64 in a plane orientated in the direction of linear movement 58 and in the vertical direction, and, moreover, to enable a forward pivoting movement of the translation lever 64, i.e. towards the skin to be deformed, in order thus to compensate for the movement of the first arm 66 of the main lever 54. To this end, the joint connector 90 can be, for example, a part of a cross joint or of a ball joint. The second end of the translation lever 64 is hinged to the first arm 66 with a corresponding joint with several degrees of freedom.

In another embodiment, which is not shown here in more detail, the joint at the joint connector 90 is a pure hinge joint with only a single degree of freedom, and the drive rod 82 is rotatably mounted about its longitudinal axis.

What is claimed is:

1. A drive mechanism for deforming a skin of a deformable structural component of a fluid-dynamic flow body, the drive mechanism comprising:
   a linearly movably driven linear movement unit configured to move linearly in a linear movement direction; and
   a transmission element comprising a translation lever having a first end pivotally coupled at the linear movement unit about a first pivot axis transverse to the linear movement direction and a second end, opposite to the first end, pivotally coupled at a rotatable mounted load introduction device about a second pivot axis transverse to the linear movement direction, the translation lever being configured to translate the linear movement of the linear movement unit into second end linear movement of the second end of the translation lever, the second end linear movement being transverse to the linear movement of the linear movement unit and generating rotary movement of the rotatably mounted load introduction device to introduce a deformation force onto the skin of the structural component.

2. The drive mechanism according to claim 1, wherein the translation lever is configured as one of a toggle joint and part of a toggle joint mechanism.

3. The drive mechanism according to claim 1, wherein the translation lever has at least one of the following configurations:
   the translation lever is mounted in an articulated manner to move both in a single plane and out of the plane;
   the translation lever is mounted on the linear movement unit with predetermined degrees of freedom or in a multi-axially articulated manner;
   the translation lever is mounted on the load introduction device with predetermined degrees of freedom or in a multi-axially articulated manner; and
   the translation lever is mounted on the linear movement unit in a mono-axially articulated manner and the linear movement element is mounted rotatably about a torsion axis substantially extending in the direction of movement of the linear movement element.

4. The drive mechanism according to claim 1, wherein the linear movement unit is configured such that at least one movement direction component of the linear movement direction of the linear movement unit extends parallel to an axis of rotation of the rotary movement of the load introducing device.

5. The drive mechanism according to claim 1, wherein the linear movement unit includes a drive rod displaceably mounted in its longitudinal direction.

6. The drive mechanism according to claim 1, wherein the linear movement unit includes a plurality of rod elements successively arranged in a direction of movement of the linear movement unit and coupled to each other in an articulated manner.

7. The drive mechanism according to claim 1, wherein the linear movement unit is configured such that a largest movement direction component of the linear movement direction of the linear movement unit extends parallel to an axis of rotation of the rotary movement of the load introducing device.

8. The drive mechanism according to claim 1, wherein the linear movement unit is configured such that an entirety of the linear movement direction of the linear movement unit extends parallel to an axis of rotation of the rotary movement of the load introducing device.

9. The drive mechanism according to claim 1, wherein the translation lever is configured as a straight lever that extends linearly between the first and second ends.

10. The drive mechanism according to claim 9, wherein the translation lever is configured as one of a toggle joint and part of a toggle joint mechanism.

11. The drive mechanism according to claim 9, wherein the translation lever has at least one of the following configurations:
    the translation lever is mounted in an articulated manner to move both in a single plane and out of the plane;
    the translation lever is mounted on the linear movement unit with predetermined degrees of freedom or in a multi-axially articulated manner;
    the translation lever is mounted on the load introduction device with predetermined degrees of freedom or in a multi-axially articulated manner; and
    the translation lever is mounted on the linear movement unit in a mono-axially articulated manner and the linear movement element is mounted rotatably about a torsion axis substantially extending in the direction of movement of the linear movement element.

12. The drive mechanism according to claim 9, wherein the linear movement unit includes a drive rod displaceably mounted in its longitudinal direction.

13. The drive mechanism according to claim 9, wherein the linear movement unit includes a plurality of rod elements successively arranged in a direction of movement of the linear movement unit and coupled to each other in an articulated manner.

14. A deformable structural component for a fluid-dynamic body of a vehicle, the deformable structural component comprising:
    a skin;
    a rotatably mounted load introduction device; and
    a drive mechanism comprising:
       a linearly movably driven linear movement unit configured to move linearly in a linear movement direction; and
       a transmission element comprising a translation lever having a first end pivotally coupled at the linear movement unit about a first pivot axis transverse to the linear movement direction and a second end, opposite to the first end, pivotally coupled at a rotatably mounted load introduction device about a second pivot axis transverse to the linear movement direction, the translation lever being configured to translate the linear movement of the linear movement unit into second end linear movement of the second end of the translation lever, the second end linear movement being transverse to the linear movement of the linear movement unit and generating rotary movement of the rotatably mounted load introduction device to introduce a deformation force onto the skin of the structural component.

15. A lift-assisting device for an airplane configured as a droop nose device, comprising the deformable structural component according to claim 14.

16. The deformable structural component according to claim 14, wherein
    the translation lever is configured as a straight lever that extends linearly between the first and second ends.

17. The deformable structural component according to claim 14, wherein
   the skin is fixed at its end portions to be stationary; and
   the drive mechanism is configured to deform a middle portion of the skin that extends in a curved manner between the end portions.

18. A lift-assisting device for an airplane configured as a droop nose device, comprising the deformable structural component according to claim 17.

19. A fluid-dynamic flow body in which a trailing edge region is formed by the deformable structural component according to claim 14.

20. A fluid-dynamic flow body in which a trailing edge region is formed by the deformable structural component according to claim 17.

* * * * *